United States Patent
Ayotte

(10) Patent No.: US 10,693,557 B1
(45) Date of Patent: Jun. 23, 2020

(54) DUAL FIDELITY CONNECTIVITY ON-BOARD A VEHICLE

(71) Applicant: GOGO LLC, Chicago, IL (US)

(72) Inventor: Loren Ayotte, Naperville, IL (US)

(73) Assignee: GOGO LLC, Chicago, IL (US)

( * ) Notice: Subject to any disclaimer, the term of this patent is extended or adjusted under 35 U.S.C. 154(b) by 0 days.

(21) Appl. No.: 16/364,295

(22) Filed: Mar. 26, 2019

(51) Int. Cl.
*H04B 10/114* (2013.01)
*H04B 10/116* (2013.01)
*B60R 16/023* (2006.01)
*H04W 4/48* (2018.01)

(52) U.S. Cl.
CPC ........ *H04B 10/1149* (2013.01); *B60R 16/023* (2013.01); *H04B 10/116* (2013.01); *H04W 4/48* (2018.02)

(58) Field of Classification Search
CPC ....... H04B 10/11–116; H04W 4/40–48; H04N 21/2146; H04N 21/41422
See application file for complete search history.

(56) References Cited

U.S. PATENT DOCUMENTS

| 8,344,912 B2 | 1/2013 | Mitchell et al. | |
|---|---|---|---|
| 2011/0302616 A1* | 12/2011 | Mizukami | H04B 10/1149 725/76 |
| 2014/0226983 A1* | 8/2014 | Vargas | H04B 10/116 398/66 |
| 2017/0230859 A1* | 8/2017 | Nadji | H04L 47/12 |
| 2017/0353350 A1 | 12/2017 | Gussen et al. | |
| 2018/0007137 A1* | 1/2018 | Watson | H04L 67/12 |
| 2018/0048542 A1* | 2/2018 | Still | H04L 43/0811 |

FOREIGN PATENT DOCUMENTS

| CN | 106817163 A | 6/2017 |
|---|---|---|
| EP | 2393225 A1 | 12/2011 |
| KR | 101358347 B1 | 2/2014 |

OTHER PUBLICATIONS www.lificongress.com, Global LiFi Congress Visible Light Communication, 2018.

* cited by examiner

*Primary Examiner* — Casey L Kretzer
(74) *Attorney, Agent, or Firm* — Marshall, Gerstein & Borun LLP; Randall G. Rueth

(57) ABSTRACT

Systems and methods for providing dual fidelity communications to devices on board a vehicle. The systems and method integrate light fidelity (LiFi) communications with traditional vehicle radio frequency (RF) communications and/or wired communications systems. The systems and method may include detecting data packets addressed to devices on-board the vehicle and determining a metric associated with a data packet and or data stream associated with the data packet. Based on the determined metric, the data packet is routed over the LiFi communication system or the traditional RF or wired communication system.

21 Claims, 7 Drawing Sheets

US 10,693,557 B1

DUAL FIDELITY CONNECTIVITY ON-BOARD A VEHICLE

TECHNICAL FIELD

The following disclosure relates to integrating dual fidelity connectivity on-board a vehicle, and more particularly, for integrating light fidelity (LiFi) communications with traditional on-board vehicle RF communication systems.

BACKGROUND

Networks located on-board a vehicle face increasing capacity constraints. As vehicles are designed to transport ever more passengers carrying personal electronic devices, and as the internet of things (IoT) increases the number of connected devices on vehicles, on-board vehicle networks must adapt to be able to accommodate the increased number of connected devices. In addition to the number of devices, the services utilized by passengers (e.g., streaming music, video, VPN) require ever increasing amounts of bandwidth. Accordingly, there is a need to provide dual fidelity connectivity on-board vehicles to alleviate the increasing capacity demands associated with on-board networks.

SUMMARY OF THE DISCLOSURE

In one embodiment, a system for providing dual fidelity communications on-board a vehicle that includes a plurality of seats having corresponding seatback devices installed thereat is provided. The system includes (1) a radio frequency (RF) router operatively connected to one or more wireless access points distributed throughout the vehicle; and (2) a light fidelity (LiFi) router operatively connected to a plurality of lights disposed within respective overhead light systems. Each of the lights are configured to emit light directed towards a photo-detector associated with a seat corresponding to the respective overhead light system (OLS). The system also includes a network controller operatively connected to the RF router and the LiFi router. The network controller is configured to (i) identify data streams associated with devices on-board the vehicle, wherein one or more of the data streams are associated with seatback devices on-board the vehicle; (ii) analyze the identified data streams to determine a metric associated with the one or more data streams; and (iii) based on the metric associated with a particular data stream associated with a particular seatback device, route data packets that form the particular data stream to one of the RF router or the LiFi router for transmission the particular seatback device.

In another embodiment, a dual fidelity access point disposed within a vehicle that includes a plurality of seats having corresponding seatback devices installed thereat is provided. The dual fidelity access points includes (1) one or more transceivers configured to communicate with the plurality of devices via a radio frequency (RF) communication protocol; and (2) one or more light emitting diodes (LEDs) configured to emit light in accordance with a light fidelity (LiFi) communication protocol. The emitted light is detected by photo-detectors operatively connected to respective seatback devices. The dual fidelity access point also includes (3) a bus interface communicatively coupled to a network controller; and (4) a controller configured to (i) obtain, via the bus interface, data packets addressed to devices within a footprint of the dual fidelity access point; (ii) identify data streams associated with the data packets, wherein one or more of the data streams are associated with seatback devices on-board the vehicle; (iii) analyze the data streams to determine a metric associated with the one or more data streams; and (iv) based on the metric for a particular data stream associated with a particular seatback device, communicate the data packets that form the particular data stream to the particular seatback device via one of the one or more transceivers or the one or more LEDs.

In yet another embodiment, a system for providing dual fidelity communications on-board a vehicle is provided. The system includes (1) a wired communications interface operatively connected to vehicle control equipment located in a vehicle control deck; and (2) a light fidelity (LiFi) router operatively connected to one or more of lights disposed within the vehicle control deck. The one or more lights are configured to emit light directed towards a photo-detector operatively connected to the vehicle control equipment. The system also includes (3) one or more transceivers configured to exchange data with an external base station; and (4) a network controller operatively connected to the wired communications interface and the LiFi router. The network controller is configured to (i) obtain, via the one or more transceivers, vehicle control data; (ii) routing a first portion of the vehicle control data to the vehicle control equipment via the wired communications interface; and (iii) routing a second portion of the vehicle control data to the vehicle control equipment via the LiFi router

DETAILED DESCRIPTION

Figure 1A:
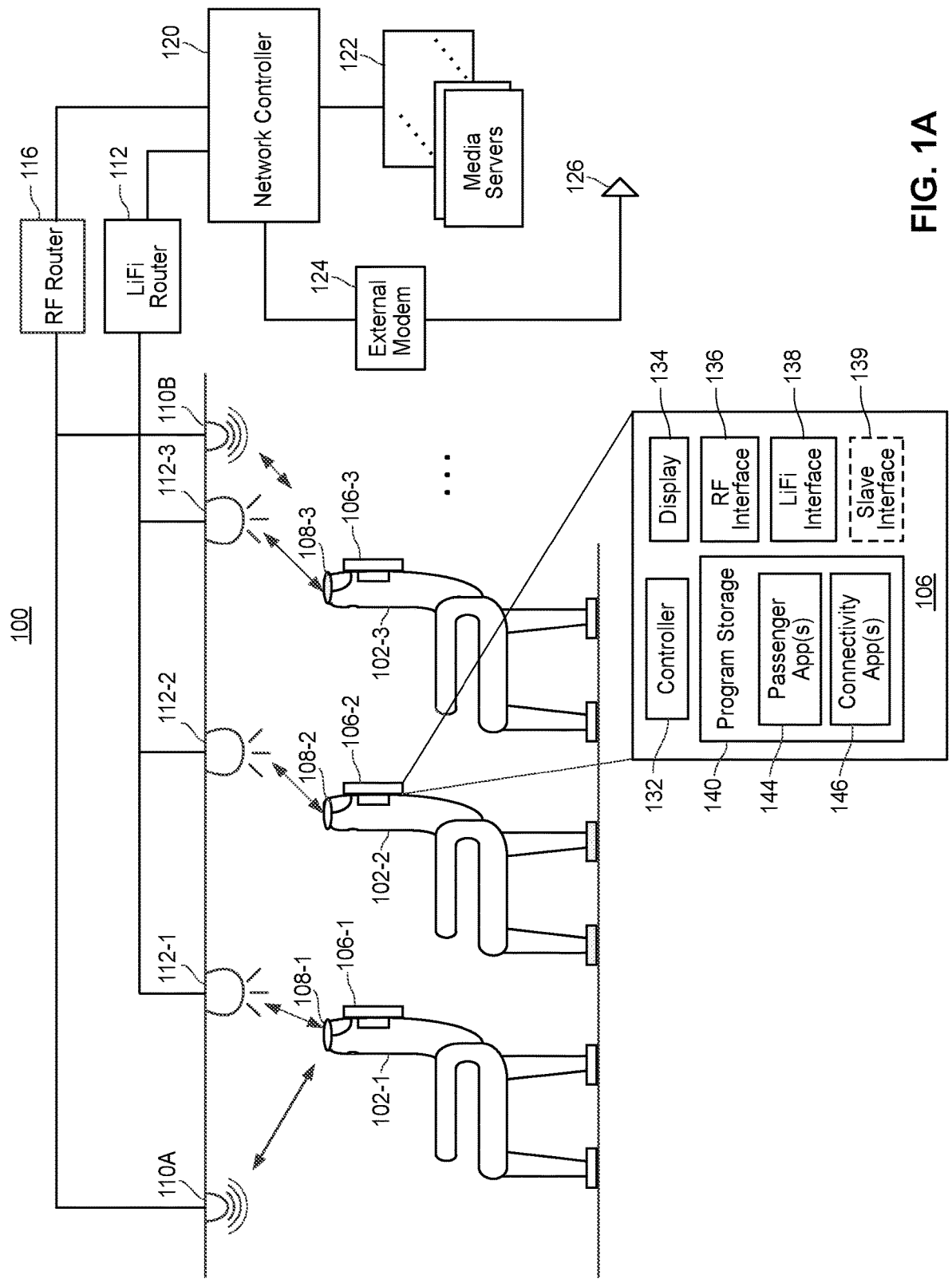
FIG. 1A depicts an example centralized dual fidelity communication system that integrates LiFi communications with overhead light systems on-board a vehicle.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Light fidelity (LiFi) communication involves encoding data by using a modulation technique, such as on-off keying (OOK) or color shift keying (CSK), and controlling lights, such as light emitting diodes (LEDs), to emit light indicative of the encoded data in accordance with the modulation technique. The light emitted by the LEDs is detected by a photo-detector and decoded into the underlying data. For ease of explanation, the term LED is used generically as a light controllably configured to operate in accordance with a LiFi communication protocol. In some embodiments, lights other than a conventional LED are configured to operate in accordance with the LiFi protocol. Accordingly, any reference to LED envisions these alternate controllable light sources. As one example of LiFi communication protocol, IEEE 802.15.7 sets forth a LiFi communication standard currently under development. However, other protocols that rely upon encoding light to represent data are also envisioned. LiFi is generally associated with Visual Light Communications (VLC). However, as the name suggests, VLC is generally associated with the visible light spectrum (375 nm-780 nm), whereas LiFi may include light in the infrared (IR) spectrum (such as the near infrared spectrum) and ultraviolet (UV) spectrum (such as the UV-B spectrum).

Importantly, the frequency of light associated with LiFi communications does not overlap with the frequencies associated with radio frequency (RF) communications. For example, the near IR band is centered near 300 THz and most WiFi communication systems operate at 2.4 GHz or 5 GHz. Accordingly, a network operator can co-locate a LiFi communication system and a RF communication system with minimal cross-interference. It should be appreciated that the term "RF communication" refers to any wireless radio frequency communication scheme, including IEEE 802.11, long term evolution (LTE), new radio (NR), Bluetooth, ZigBee, constrained application protocol (CoAP), Z-Wave, and so on. Accordingly, in embodiments described herein, a LiFi communication system and a RF communication system may be integrated into a dual fidelity communication system on-board a vehicle.

FIG. 1A depicts an example centralized dual fidelity communication system 100 that integrates LiFi communications with overhead light systems 112 on-board a vehicle. For ease of explanation, the systems described herein are for the most part described herein as being on-board an aircraft. However, the techniques and principles described herein equally apply to other types of vehicles that accommodate multiple passengers, such as buses, trains, boats, ships, subway cars, military transport vehicles, other air-borne, water-borne, or land-borne vehicles, and vehicles that are suitable for space travel.

The centralized dual fidelity communication system 100 includes a number of seats 102, one, some, or all of which carry a respective seatback device 106. Seatback devices 106 may be in-flight entertainment devices that enable passengers to watch movies and/or television programming (e.g., via IPTV), for example. Alternatively, or in addition, seatback devices 106 may enable passengers to access various other services, such as Internet browsing, controlling a light within the overhead light system 112, calling a vehicle attendant, placing drink and/or food orders, and/or ordering "duty-free" items. As will be described below, if the passenger disables the light within the overhead light system 112, the LiFi connection associated with the seatback device 106 is maintained. As seen in FIG. 1A, each of seatback devices 106 are positioned on a back surface of one of seats 102. For example, seatback device 106-1 is affixed to the back of seat 102-1. The seatback devices 106 may be physically coupled to a mounting unit affixed to seats 102 via screws, clips, and/or other suitable types of hardware.

In an alternative embodiment, seatback devices 106 may instead be positioned in a manner different than that shown in FIG. 1A. For example, seatback device 106-1 may instead be affixed to an armrest of seat 102-2 (e.g., via an extendable and/or rotatable arm that can be positioned by a passenger sitting in seat 102-2).

Above each of the seats 102, the centralized dual fidelity communication system 100 includes an overhead light system (OLS) 112 that includes various interfaces (e.g., a service call button, a seatbelt indicator, a reading light, a reading light toggle button, a standby light) with which a passenger sitting at a seat 102 may interact. For example, the reading light in the OLS 112-1 above seat 102-1 may be arranged to provide an illumination light to the passenger sitting in the seat 102-2. As described herein, the OLS 112 may be configured to support LiFi communications via the reading light. In one embodiment, the reading light include two LEDs, one LED for communicating light in the visible spectrum when the passenger has enabled the reading light and one LED for communicating light outside of the visible spectrum when the passenger has disabled the reading light. In these embodiments, when the reading light is enabled, both LEDs may be configured to communicate data simultaneously. In other embodiments, the OLS 112 includes one or more LEDs, separate from the reading light, dedicated to performing LiFi communications.

Regardless of the particular arrangement of the LEDs that are configured to provide LiFi communications within the OLS 112, the seats 102 also include a respective photo-detector 108 operatively connected to the seatback device 106. For example, the photo-detector 108 may be connected to the seatback device 106 via an Ethernet connection, a USB connection or a fiber optic connection. The photo-detector 108 may be arranged on top of a head portion the seat 102, on top of the seatback device 106, on top of a mount in which the seatback device 106 rests, on a substrate disposed between the respective head portions of two adjacent seats 102, or any other location within a line of sight from the LED. In an alternative embodiment, the photo-detector 108-2 may be located in an arm rest portion of the seat 102-2 to detected LiFi communications from an LED at the OLS 112-1. Accordingly, the term "seat" as generally used herein, includes any location associated with the seating unit in which a particular seatback device 106 is disposed and is not limited to the physical cushions upon which a passenger rests. To reduce spectral interference, the OLS 112 may be arranged to communicate with adjacent seatback devices 106-1 (e.g., another seat in the same row as the seat 102-2) using different spectrums of light.

The LEDs included in the OLSs 112 are communicatively coupled to a LiFi router 118. In one embodiment, the LiFi router 118 is coupled to the OLSs 112 via an optical connection, such as a fiber optic connection. In these embodiments, the LiFi router 118 may be arranged to generate the optical signals communicated by the OLSs 112. In other embodiments, the LiFi router 118 is coupled to the OLSs 112 via a copper connection, such as a power over Ethernet (PoE) connection. In these embodiments, the OLSs 112 may include a converter configured to sense control signals from the LiFi router 118 and produce encoded optical signals to be communicated via the LEDs of the OLS 112.

In some embodiments, the centralized dual fidelity communication system 100 supports a reverse LiFi communications link. In these embodiments, the seatback devices 106 are operatively connected to one or more LEDs configured to emit light that is sensed at a photo-detector operatively connected to the OLSs 112. It should be appreciated that the optical components that support forward link communications may be disposed in different locations associated with the seats 102 and/or the OLSs 112 than the optical components that support reverse link communications. For example, the photo-detector 108-1 that detects light from the OLS 112-1 may be located on the top of the seat 102-1; whereas the LED operatively connected to the seatback device 106-1 may be disposed in the armrest of the seat 102-1. The OLSs 112 may be configured to route the optical signals sensed by the photo-detector of the OLS 112 to the LiFi router 118 for processing.

The centralized dual fidelity communication system 100 also includes a number of wireless access points 110, which are communicatively coupled (e.g., via a wired connection) to a RF router 116. While FIG. 1A shows two wireless access points 110A and 110B, more or fewer may be included on-board the vehicle. Wireless access points 110 operate according to one or more wireless communication protocols to provide RF communications to devices, such as the seatbacks devices 106, located within the vehicle. In alternate embodiments that include a single access point 110, the RF router 116 may be included in the access point 110.

Each of the seatback devices 106 may include a controller 132, a display 134, an RF interface 136, a LiFi interface 138, and a program storage 140. Controller 132 may be a single processor device (e.g., chip) or may include multiple processor devices, and generally controls the operation of the respective seatback device 106 by executing instructions stored in the program storage 140. The display 134 includes a screen and associated hardware (and possibly firmware, etc.) for presenting visual content to a passenger, and may utilize any suitable display technology. For example, the display 134 may be an LED display, OLED display, LCD display, and so on. The RF interface 136 includes hardware, firmware, and/or software that enables the respective seatback devices 106 to communicate (transmit and receive data) via one or more of wireless access points 110 using the appropriate wireless protocols. Similarly, the LiFi interface 138 includes hardware, firmware, and/or software that enables the respective seatback devices 106 to communicate (transmit and receive data) via a LiFi communication link supported by the respective photo-detectors 108 and, in some embodiments, a reverse LiFi link LED. In embodiments where the photo-detector 108 includes a transceiver configured decode the encoded light, the LiFi interface 138 may be a data port (e.g., a USB port or an Ethernet port) via which the decoded data is received at the seatback device 106.

The program storage 140 includes one or more types of non-volatile memory (e.g., a hard disk, solid state memory, etc.), and stores one or more passenger applications 144 and a connectivity application 146. The passenger applications 144 are generally configured to facilitate the provision of content and/or services via the respective seatback device 106. For example, the passenger applications 144 may include a browser application configured to provide Internet browsing capabilities, an in-transit entertainment application configured to display movies or other programming, a passenger experience application configured to enable passenger control reading lights, call a vehicle attendant and/or display a passenger status (e.g., whether or not passengers should wear their seatbelts), and/or a mapping application configured to provide route information to the passenger. The connectivity application 146 may be configured to control whether data generated by the passenger apps 144 is routed to the network controller via the RF interface 136 or the LiFi interface 138. For example, the connectivity application 146 may detected that the photo-detector 108 or the reverse LiFi link LED is blocked and transmit an indication to the network controller 120. Accordingly, the connectivity application 146 enables the seatback device 106 to utilize the LiFi interface 138 to receive forward communications and the RF interface 136 to transmit reverse communications, or vice versa.

In the implementation shown in FIG. 1A, a network controller 120 (e.g., an Airborne Control Processor Unit (ACPU)) is coupled to the RF router 116 and the LiFi router 118. While FIG. 1A depicts the RF router 116 and the LiFi router 118 as being external to the network controller 120, in some embodiments, at least one of the RF router 116 and the LiFi router 118 are a component of the network controller 120. The network controller 120 is also coupled to an external modem 124, which is in turn coupled to an antenna 126. The modem 124 and the antenna 126 may generally be configured to enable the network controller 120 to communicate with systems/nodes/devices that are not located on the vehicle, e.g., via one or more satellite, air-to ground and/or terrestrial cellular communication links. In some implementations, the centralized dual fidelity communication system 100 includes more than one external modem 124 and/or more than one antenna 126. In still other implementations (e.g., where no off-vehicle connectivity is required), the external modem 124 and the antenna 126 are not included in the centralized dual fidelity communication system 100.

The network controller 120 may include one or more computing devices, and may generally manage various communication-related (and possibly other) operations. If the seatback devices 106 are configured to provide Internet browsing capabilities, real-time programming, and/or other services requiring access to remote content, for example, the network controller 120 may receive passenger selections (made at setback devices 106) via wireless access points 110 or a photo-detector of the OLSs 112, retrieve the corresponding content from a ground source via modem 124 and antenna 126, and provide the retrieved content to seat-back passenger units 106 via wireless access points 110. As another example, if the seatback devices 106 are also (or instead) configured to vehicle-based services, such as passenger orders (e.g., for food and/or drinks), in-transit entertainment, vehicle-localized messaging and/or gaming, the network controller 120 may receive passenger selections (made at the seatback devices 106) via wireless access points 110 or a photo-detector of the OLSs 112, and route the data packets to a media server 122 associated with the vehicle-based service.

The network controller 120 may generally be configured to route data packets addressed to devices, including the seatback devices 106, located within the cabin of the vehicle. For example, the data packets may be received from the external modem 124 and/or the media servers 122. The network controller 120 may analyze network conditions associated with the RF network and/or the LiFi network to determine whether to route the data packet to the RF router 116 or the LiFi router 118. Additionally or alternatively, the network controller 120 may analyze one or more characteristics associated with the data packet addressed to the seatback device 106 to determine whether to route the data packet to the RF router 116 or the LiFi router 118. Prior to routing the data packet to the RF router 116 or the LiFi router 118, the network controller 120 may associate the data packet with an indicator identifying a particular seatback device 106 to which the data packet should be delivered. In some embodiments, the network controller 120 queries a network mapping database (not depicted) that indicates a correspondence between seatback device 106 and a corresponding network address on the RF network and/or the LiFi network at which the seatback devices 106 are accessible to determine the particular indicator to include in the data packet. Accordingly, when the RF router 116 or the LiFi router 118 receives the data packet, the RF router 116 or the LiFi router 118 respectively routes the data packet to the wireless access point 110 or OLS 112 communicatively coupled to the identified seatback device 106 for transmissions to the identified seatback device 106.

Figure 1B:
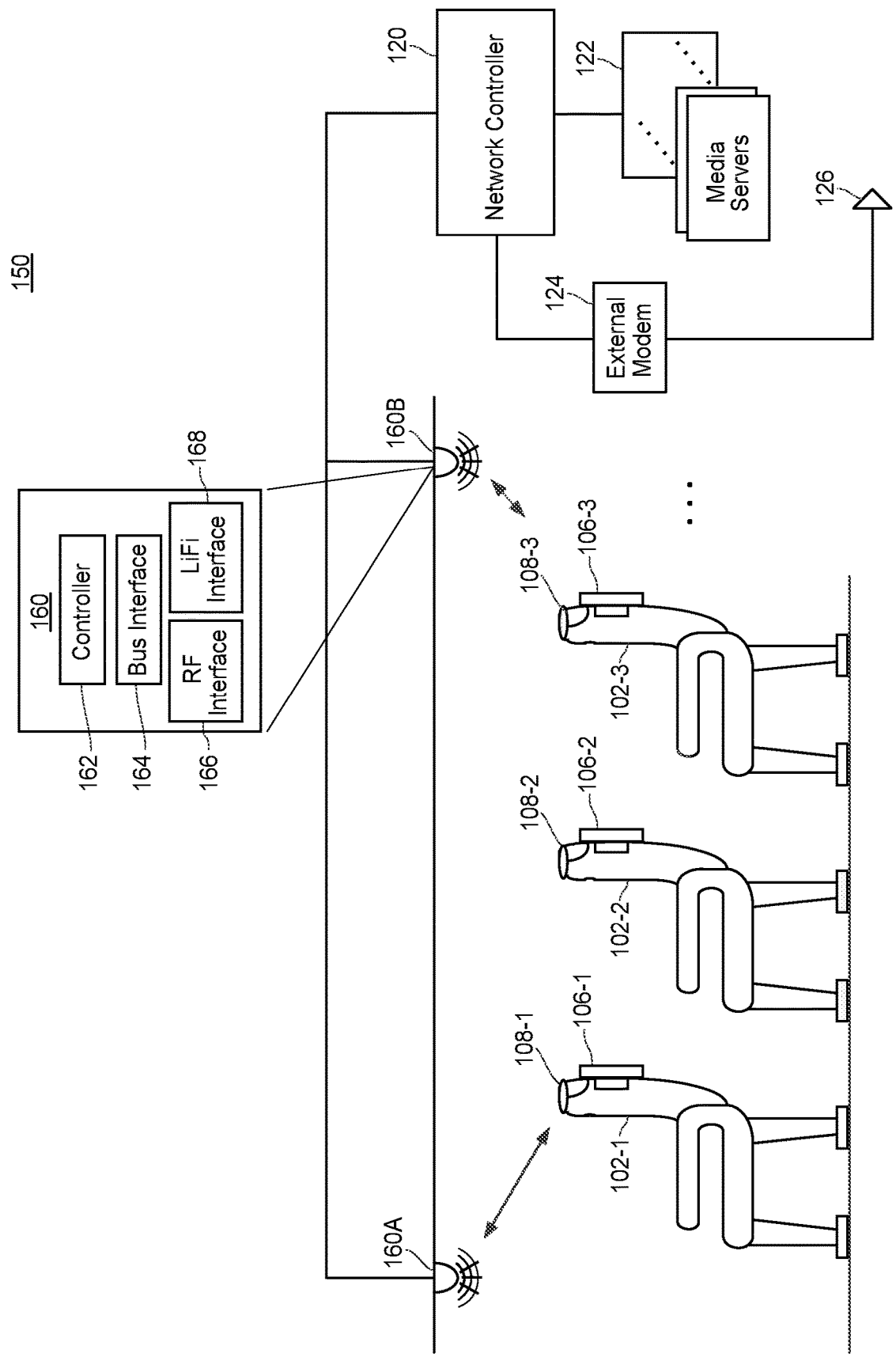
FIG. 1B depicts an example distributed dual fidelity communication system that integrates LiFi communications and RF communications at one or more dual fidelity access points disposed throughout the vehicle.

FIG. 1B depicts an example distributed dual fidelity communication system 150 that integrates LiFi communications and RF communications at one or more dual fidelity access points 160 disposed throughout the vehicle. While LiFi communications have been described by some as a point-to-point communication protocol, the light emitted by LEDs actually reflects off surfaces in the environment. This is particularly true in smaller environments that have light-colored and/or reflective surfaces, such as a vehicle cabin. Accordingly, even if an LED is not directed at a particular photo-detector 108 associated with a particular seatback device 106, the particular photo-detector 108 may still detect the encoded light produced by the LED. Thus, similarly to the wireless access points 110 providing RF communications to a plurality of devices within the vehicle cabin, a centralized light access point is able to provide LiFi communications to a plurality of LiFi-compatible devices within the vehicle cabin.

As illustrated in FIG. 1B, the distributed dual fidelity communication system 150 includes one or more dual-fidelity access points 160 disposed throughout the vehicle cabin and configured to provide both RF communications and LiFi communications to devices therein. While FIG. 1B shows two dual-fidelity access points 160A and 160B, more or fewer may be included on-board the vehicle. Each dual-fidelity access point 160 include a controller 162, a bus interface 164, an RF interface 166, and a LiFi interface 168. The controller 162 may be a single processor device (e.g., chip) or may include multiple processor devices, and generally controls the operation of dual-fidelity access point 160 by executing instructions stored in a memory thereat. The RF interface 166 includes hardware, firmware, and/or software that enables the dual-fidelity access point 160 to communicate (transmit and receive data) using the appropriate wireless protocols. To this end, the RF interface 166 may operate in a similar manner as the wireless access point 110 of FIG. 1A.

The LiFi interface 168 includes hardware, firmware, and/or software that enables the dual-fidelity access point 160 to communicate (transmit and receive data) via a LiFi communication link supported by the photo-detectors 108 and, in some embodiments, reverse LiFi link LEDs. The LiFi interface 168 may be configured to establish simultaneous communications with several of the seatback devices 106. In some embodiments, the LiFi interface 168 includes a plurality of LEDs radially and/or azimuthally distributed throughout the dual-fidelity access point 160 to improve the ability for the dual-fidelity access point 160 to target particular seatback devices 106. Accordingly, similar to how a terrestrial base station may establish two or more sectors to spatially divide an RF footprint, the dual-fidelity access point 160 and/or the LiFi interface 168 may establish sectors to spatially divide a LiFi footprint.

Additionally, the LiFi interface may include multiple LEDs configured to emit light using different portions of the light spectrum. For example, orthogonal frequency division multiplexing (OFDM) techniques that are used to avoid cross-channel interference in LTE networks can be implemented by the LiFi interface 168 to avoid spectral interference within a particular light spectrum. To this end, the LiFi interface 168 may be configured to transmit composite light signals that carry a plurality of light-encoded data packets at different light spectrums. Accordingly, the dual-fidelity access point 160 may include two or more LEDs configured to generate respective component light signals that form the composite light signal. In this example, a tunable light filter included in the LiFi interface 138 of the seatback devices 106 may be configured to extract, from the light detected by the photo-detector 108, the component light signal associated with the communications between the seatback device 106 and the dual-fidelity access point 160.

The bus interface 164 is configured to exchange data with the network controller 120 via a communication bus therebetween. For example, the communication bus may be an Ethernet connection, a power line communication (PLC) connection, or any other known arrangement for connecting vehicle access points to a centralized network controller. In some embodiments, the bus interface 164 includes a first interface for receiving data packets to be routed over the RF interface 166 and a second interface for receiving data packets to be routed over the LiFi interface 168. The controller 162 may be configured to analyze data received over the bus interface 164 to determine whether to route the data packets over the RF interface 166 or the LiFi interface 168. In some embodiments, the controller 162 determines the particular interface of the bus interface 164 via which the data packet was received and/or identifies a flag appended to the data packet by the network controller 120 to determine which of the RF interface 166 or the LiFi interface 168 to route the data packet. Additionally or alternatively, the controller 162 may analyze one or more characteristics of the data packet and/or network conditions associated with the RF network and/or the LiFi network to determine which of the RF interface 166 or the LiFi interface 168 to route the data packet.

Similar to the centralized dual fidelity communication system 100, the network controller 120 obtains data packets addressed to devices within the vehicle cabin from one of the media servers 122 or from an external model 124 that supports off-vehicle communications via the antenna 126. In some embodiments, the network controller 120 determines whether the data packets should be routed over an RF interface 166 or a LiFi interface 168 of a dual-fidelity access point 160. In these embodiments, the network controller 120 may be configured to append a flag indicative of the determined interface and/or route the data packet over a particular bus connected to the dual-fidelity access point 160. In other embodiments, the network controller 120 identifies which of the dual-fidelity access points 160 the data packet should be routed (e.g., based on a location of the device to which the data is addressed), which in turn determines which of the RF interface 166 or the LiFi interface 168 to route the data. The seatback devices 106 in the distributed dual fidelity communication system 150 may be configured in the same manner as described with respect to the centralized dual fidelity communication system 100.

Figure 2:
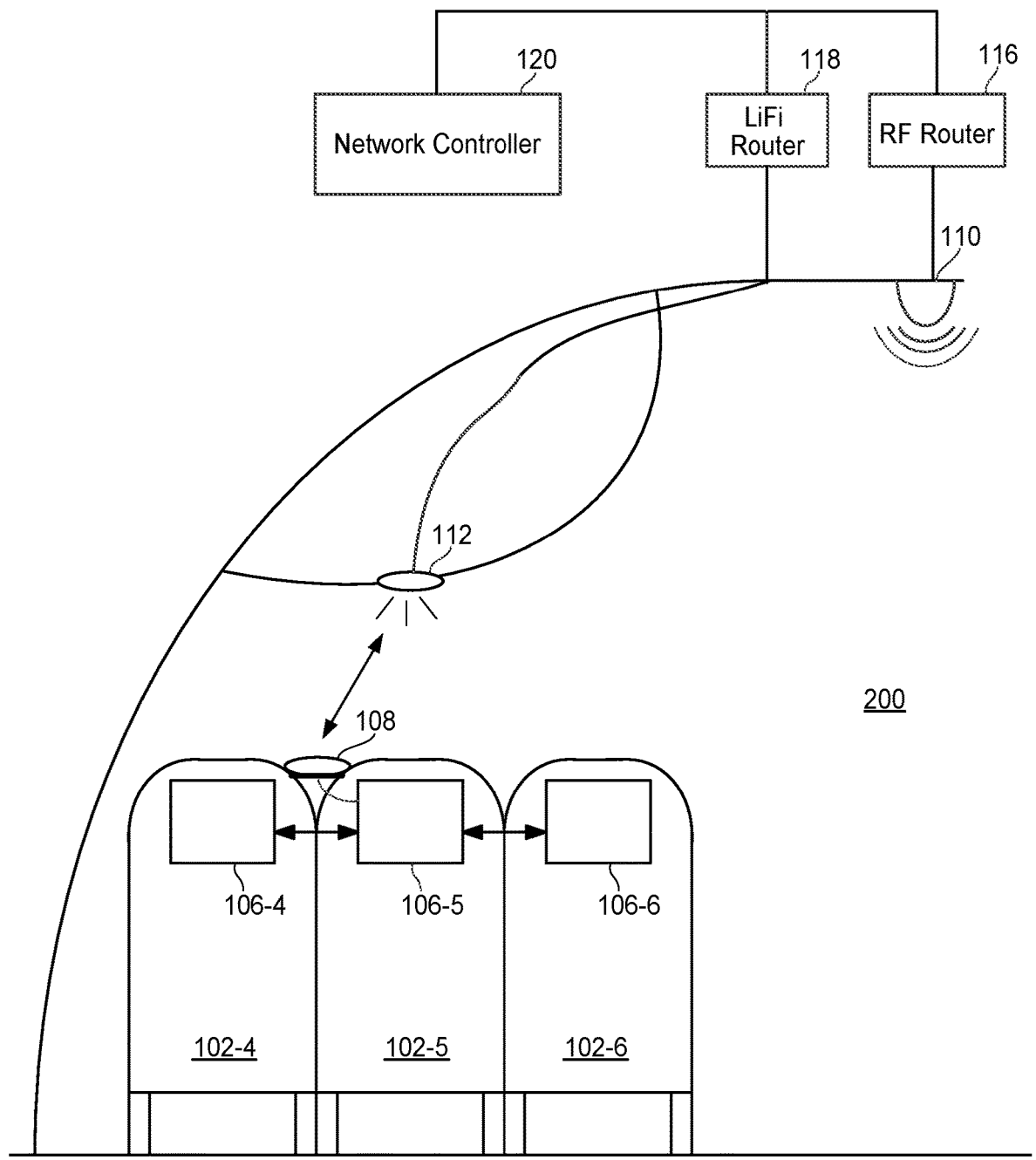
FIG. 2 illustrates an example environment in which the centralized dual fidelity communication system of FIG. 1A includes seatback devices configured in a master-slave arrangement.

FIG. 2 illustrates an example environment 200 in which the centralized dual fidelity communication system 100 includes seatback devices 106 configured in a master-slave arrangement. It should be appreciated that the configuration of seatback devices 106 may also be implemented in the distributed dual fidelity communication system 150. In the environment 200, rather than each seatback device 106 being operatively coupled to a respective photo-detector 108, a single photo-detector 108 is utilized to sense light-encoded data packets addressed to any of the seatback devices 106 located in a seating unit (such as the seating unit comprised of the seat 102-4, the seat 102-5, and the seat 102-6).

Accordingly, the network controller 120 may be configured to route data packets addressed to any of the seatback devices 106-4, 106-5, or 106-6 to the OLS 112, which utilizes an LED of a LiFi interface to emit light directed at the photo-detector 108. In alternate embodiments, the network controller 120 may be configured to route data packets addressed to any of the seatback devices 106-4, 106-5, or 106-6 to the dual fidelity access point 160 associated with a network footprint that includes the photo-detector 108. In the environment 200, the photo-detector 108 is disposed on a substrate located between the head portions of the seats 102-4 and 102-5; however, in alternate embodiments, the photo-detector 108 may be disposed in any location associated with the seat unit where the photo-detector 108 is able to sense light emitted from the OLS 112.

As illustrated, the seatback device 106-5 is communicatively coupled to the seatback devices 106-4 and 106-6 via respective slave interfaces 139. The slave interface 139 may be any wired or wireless communications interface. For example, the slave interface 139 may be a wired connection between the master and slave seatback devices. As another example, the slave interface may be a Bluetooth or ZigBee connection between the master and slave seatback devices. The connectivity application 146 of the seatback device 106-5 may be configured to store a network address associated with the seatback devices 106-4 and 106-6 and an indication of the particular slave interface 139 via which the seatback devices 106-4 and 106-6 are communicatively coupled to the seatback device 106-5.

The connectivity application 146 of the seatback device 106-5 may be configured to analyze any data packets detected by the photo-detector 108 to determine which of the seatback devices 106-4, 106-5, or 106-6 to which the data packet is addressed. For example, the address of the destination seatback device 106 may be included in the header of the data packet. Accordingly, the connectivity application 146 may be configured to compare the address from the data packet to the addresses associated with the slave seatback devices 106-4 and 106-6, as well as its own address. If the address indicated by the data packet matches an address associated with a slave seatback device, the connectivity application 146 routes the data packet over the corresponding slave interface 139.

Similarly, the connectivity application 146 may be configured to obtain data packets generated by the seatback devices 106-4 and 106-6 via the respective slave interfaces 139. In some embodiments, the connectivity application 146 may package the data packets generated at the seatback device 106-5 with any data packets obtained via the slave interfaces 139 into a composite data packet that is unpackaged at the network controller 120 for individual processing. Additionally or alternatively, the connectivity application 146 may route data packets associated with a first one of the seatback devices 106-4, 106-5, and 106-6 over the RF interface 136 data packets associated with a second one of the seatback devices 106-4, 106-5, and 106-6 over the LiFi interface 138.

Figure 3:
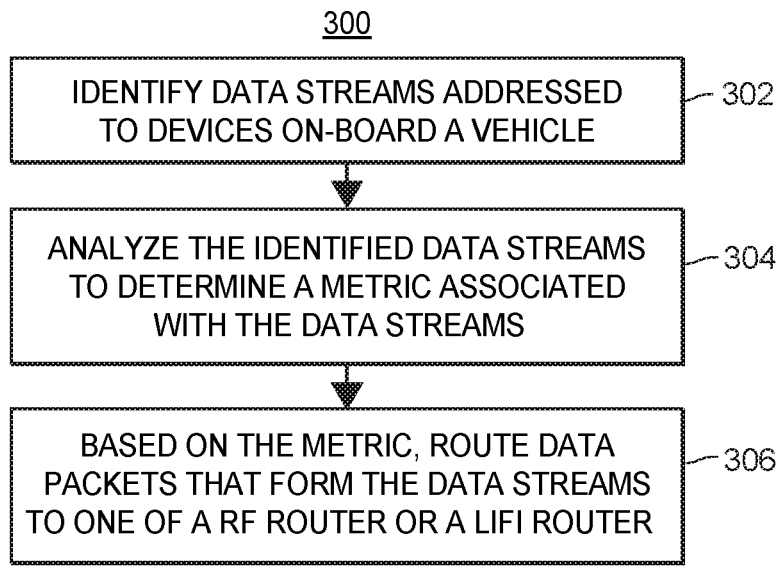
FIG. 3 is a flow diagram of an example method for providing dual fidelity communications on-board a vehicle equipped with a centralized dual fidelity communication system of FIG. 1A.

FIG. 3 depicts an example method 300 for providing dual fidelity communications on-board a vehicle (e.g., an aircraft, bus, train, subway, military transport vehicle, space craft, etc.). More particularly, the method 300 relates to routing data over one of a RF network or a LiFi network that provide network connectivity within the vehicle. The method 300 may be implemented by a network controller, such as the network controller 120 of any one of FIGS. 1A, 1B, and 2, for example. Various components of FIGS. 1A, 1B, and 2 are referred to in the description of the method 300 for purposes of providing specific, non-limiting examples.

The method 300 begins when the network controller identifies data streams associated with devices on-board the vehicle (block 302). The identified data streams may include data packets exchanged between a seatback device (e.g., the seatback devices 106) and a media server associated with in-vehicle services (e.g., the media servers 122) or an external content provider. Accordingly, the network controller may be configured to obtain a plurality of data packets from the media servers and/or an external modem (e.g., the external modem 124) that supports communications with external content providers. The network controller may then analyze the obtained data packets to identify a particular stream of data associated with each data packet.

As an example, many types of communications include a session identifier that identifies data exchanged by a particular application executing on a device and the corresponding content server. In some scenarios, the same seatback device may concurrently support multiple communication sessions with different content servers. The session identifier are typically included in a header of the composite data packets. Accordingly, the network controller may be configured to identify the data stream based on analyzing the session identifier included in a data packet header. For some types of communications, the underlying data is obscured from analysis by the network controller, such as encrypted communication services or a virtual private network (VPN) service. For these types of communication, the network controller may identify the data stream based upon the origination and/or destination addresses included in the data packet.

At block 304, the network controller analyzes the identified data streams to determine a metric associated with the data streams that include a seatback device as an endpoint. The metric may be indicative of an amount of data required to transmit the data stream or minimum performance level for the service supported by the data stream. For example, the metric may be indicative of an amount of bandwidth required to transmit the data packets that form the particular data stream and/or all of the identified data streams. As another example, the metric may be indicative of a particular application executing on the seatback device that is transmitting or receiving the data packets. In one scenario, the particular application is a software and/or media loading application executing on the seatback device. In this scenario, despite the software and/or media loading application generally requiring large amounts of bandwidth, the software and/or media loading functionality may nonetheless be considered a low priority application. Accordingly, in this scenario, the network controller may avoid allocating resources of the RF network to the software and/or media loading application by utilizing the LiFi network.

In some embodiments, the LiFi network is utilized to provide communications to devices located in nulls or "dead zones" associated with the RF network. In these embodiments, the metric may additionally or alternatively be indicative of a connection quality between the seatback device associated with the data packet and the RF access point. Accordingly, the metric may be based on at least one of signal strength, signal to noise ratio, carrier to noise ratio, receive power, transmit power, packet loss rate, and/or round trip time.

Similarly, in some embodiments, a photo-detector (e.g., a photo-detector 108) associated with a particular seatback device may be covered up a passenger article. Accordingly, the LiFi connection between the particular seatback device and the network controller may be unusable. Thus, the metric may be indicative of whether or not a LiFi connection between the seatback device associated with the data packet and the network controller can be established. It should be appreciated that the determined metric may be a combination of one or more other metrics, including the above-described metrics. For example, the network controller may be configured to apply a weighting function and/or machine learning techniques to combine the other metrics into the determined metric.

At block 306, based on the determined metric, the network controller routes the data packets associated with data streams to one of an RF router (e.g., the RF router 116) or a LiFi router (e.g., the LiFi router 118) for transmission to the addressed seatback device. For example, in some implementations, the LiFi network may be less reliable than the RF network.

Accordingly, if the metric indicates the data stream is bandwidth intensive (e.g., by determining the metric is above a threshold bandwidth), associated with a streaming media application (e.g., video on demand, satellite TV, video conferencing) and/or associated with a quality of service (QoS) identifier above a threshold QoS level, the network controller may route the data packets that form the data stream to the RF router. Conversely, if the metric indicates the data stream is not bandwidth intensive (e.g., by determining the metric is below a threshold bandwidth), not associated with a streaming media application (e.g., the particular application is a software and/or media loading application), and/or associated with a QoS identifier below the threshold QoS level, the network controller may route the data packets that form the data stream to the LiFi router.

Similarly, in some implementations, the LiFi network serves as an offloading network for when the RF network is overloaded. Accordingly, if the network controller determines that a metric indicative of an aggregate amount of bandwidth required to transmit each of the identified data streams exceeds a threshold bandwidth, the network controller may then route the data packets that form the particular individual data streams to the LiFi router. For example, the network controller may select the particular individual data streams based on the data stream requiring bandwidth below the bandwidth threshold and/or not being associated with a streaming media application.

It should be appreciated that threshold bandwidth may vary depending upon the geographic location of the vehicle. For example, the vehicle may carry passengers between different regulatory jurisdictions, such as from the United States to Japan. In this example, the United States may permit the RF network to transmit over some frequencies that are not permitted in Japan. Accordingly the RF network may have fewer channels available to support the aggregate bandwidth requirement when the vehicle is located in the Japanese regulatory jurisdiction. Thus, the network controller may be configured to lower the bandwidth threshold for LiFi offloading when the vehicle is located in the Japanese regulatory jurisdiction, In implementations where the LiFi network is used to mitigate nulls or "dead zones" associated with the RF network, the network controller may identify data streams associated with a seatback device having a connection quality metric below a threshold connection quality. Accordingly, the network controller may be configured to route the data packets that form the identified data streams to the LiFi router. Similarly, if the metric is indicative of whether or not a LiFi connection between the seatback device associated with the data stream and the network controller is available, the network controller may be configured to route the data packets that form the data stream to the RF router when the LiFi connection is unavailable.

It should be appreciated that the network controller and/or connectivity applications (e.g., the connectivity application 146) at the seatback devices may be configured to support hybrid fidelity communications. For example, in embodiments configured with a LiFi reverse link, the network controller may route forward data packets for a data stream to the RF router for transmission to the seatback device and receive reverse data packets for the data stream from the seatback device via the LiFi router, and vice versa.

In some embodiments, when the network controller routes the data packets to the LiFi router, the network controller is also configured to indicate which spectrum of light should be utilized to encode the data packet. For example, if the network controller is routing data packets associated with two seatback devices located proximate to one another (e.g., located in the same seat unit or in an adjacent row), the network controller may indicate that data packets that form the data streams to the proximate seatback devices should be encoded using two different, non-overlapping light spectra. As another example, the network controller may be configured to receive indications of whether or not a reading light associated with the same seat as the seatback device associated with the data stream is enabled. If the network controller determines that the reading light is enabled, the network controller may indicate that the data packet should be encoded using light within the visible light spectrum. Conversely, if the network controller determines that the reading light is disabled, the network controller may indicate that the data packet should be encoded using light within the infrared or ultraviolet light spectra. Accordingly, when the LiFi router and/or a OLS associated with the addressed seatback receives the data packet, the LiFi router and/or the OLS may be configured to encode the data packet using the spectrum of light indicated by the network controller.

In some embodiments, a data stream identified at block 302 is a requested data stream that is in the process of being established by the network controller. For example, the network controller may be configured to receive a request from a particular seatback device to obtain live TV content from a media server. In this example, the network controller may be configured to perform the analysis at block 304 in order to determine whether to establish the data stream for the live TV service with the LiFi network, the RF network, or a combination thereof. In this example, the network controller may be configured to establish the data stream with one of the RF router and/or the LiFi router and, at block 306, route the forward traffic associated with the established data stream to one of the RF router or the LiFi router.

While the foregoing description describes implementing the method 300 at the centralized dual fidelity communication system 100 and/or 200 of FIGS. 1A and 2, respectively, the method 300 may be adapted for implementation at the distributed dual fidelity communication system 150 of FIG. 1B. To this end, rather than routing the data packets to one of the RF router 116 or the LiFi router 118, the network controller 120 may route the data packets over a particular bus interface between the dual-fidelity access point 160 and/or modify the data packets to include an indication of whether the dual-fidelity access point 160 should route the data packet over the RF interface 166 or the LiFi interface 168 prior to routing the data packets to the dual-fidelity access point 160.

Figure 4:
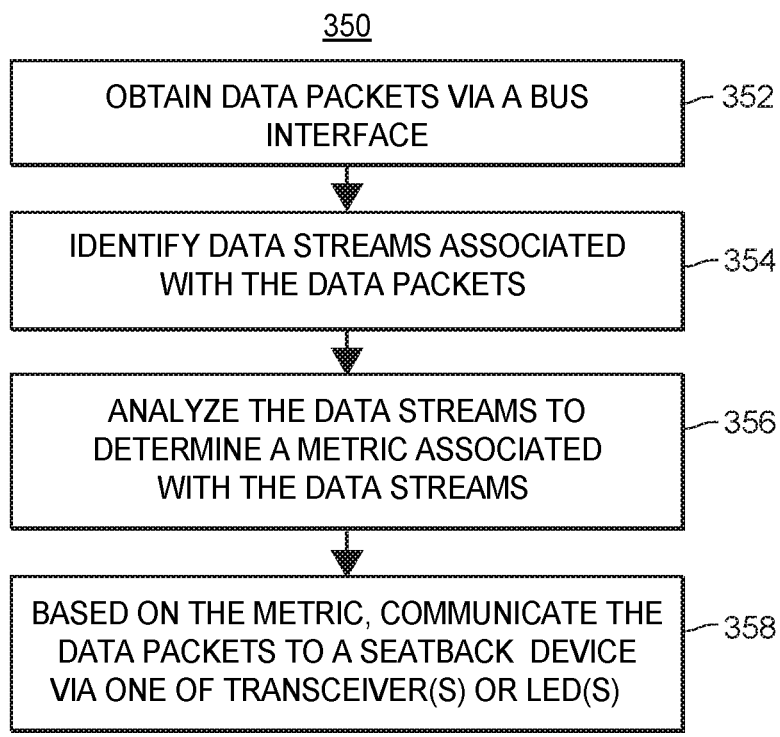
FIG. 4 is a flow diagram of an example method for providing dual fidelity communications on-board a vehicle equipped with a distributed dual fidelity communication system of FIG. 1B.

FIG. 4 depicts an example method 350 for providing dual fidelity communications on-board a vehicle (e.g., an aircraft, bus, train, subway, military transport vehicle, space craft, etc.). More particularly, the method 350 relates to routing data over one of a RF network via one or more transceivers or a LiFi network via one or more LEDs. The method 350 may be implemented by a dual-fidelity access point, such as the dual fidelity access point 160 of FIG. 1B, for example. Various components of FIGS. 1A, 1B, and 2 are referred to in the description of the method 350 for purposes of providing specific, non-limiting examples.

The method 350 begins when the dual fidelity access point obtains, via a bus interface, data packets address to devices within a footprint of the dual fidelity access point (block 352). The bus interface may be configured to communicative couple the dual fidelity access point and a network controller (e.g., the network controller 120). For example, the bus interface may be an Ethernet interface.

At block 354, the dual fidelity access point identifies data streams associated with the data packets. The data streams may include data streams associated with one or more seatback devices (e.g., the seatback devices 106). The dual fidelity access point may then analyze the obtained data packets to identify a particular stream of data associated with each data packet. For example, the dual fidelity access point may be configured to identify the data stream based on analyzing the session identifier included in a data packet header and/or the origination and/or destination addresses included in the data packet.

At block 356, the dual fidelity access point analyzes the identified data streams to determine a metric associated with the data streams. The metric may be indicative of an amount of data required to transmit the data stream or minimum performance level for the service supported by the data stream. For example, the metric may be indicative an amount of bandwidth required to transmit the data packets that form the particular data stream and/or all of the identified data streams. As another example, the metric may be indicative of a particular application executing on the seatback device that is transmitting or receiving the data packets. As yet another example, the metric may be indicative of a QoS identifier associated with the identified data stream.

In some embodiments, the LiFi network is utilized to provide communications to devices located in nulls or "dead zones" associated with the RF network. In these embodiments, the metric may additionally or alternatively be indicative of a connectional quality between the seatback device associated with the data packet and the one or more transceivers of the dual fidelity access point. Accordingly, the metric may be based on at least one of signal strength, signal to noise ratio, carrier to noise ratio, receive power, transmit power, packet loss rate, and/or round trip time.

Similarly, in some embodiments, a photo-detector (e.g., a photo-detector 108) associated with a particular seatback device may be covered up a passenger article. Accordingly, the LiFi connection between the particular seatback device and the dual fidelity access point may be unusable. Thus, the metric may be indicative of whether or not a LiFi connection between the seatback device associated with the data packet and the dual fidelity access point can be established. It should be appreciated that the determined metric may be a combination of one or more other metrics, including the above-described metrics. For example, the dual fidelity access point may be configured to apply a weighting function and/or machine learning techniques to combine the other metrics into the determined metric.

At block 358, based on the determined metric, the dual fidelity access point communicates the data packets that form the data streams to the destination seatback device via one or more transceivers of an RF interface (e.g., the RF interface 166) or one or more LEDs of a LiFi interface (e.g., the LiFi interface 168) for transmission to the addressed seatback device. In some embodiments, when the dual fidelity access point routes the data packet to the LiFi interface, the dual fidelity access point determines a particular LED of the LiFi interface that is generally directed toward the addressed seatback device. For example, the dual fidelity access point may include a seat map that identifies a correspondence between particular LEDs of the LiFi interface and one or more seatback devices (and/or identifiers associated with the LiFi network thereof). Accordingly, in these embodiments, when the dual fidelity access point routes the data packet to the LiFi interface, the data packet is routed to a particular LED thereof.

In some implementations, the LiFi network may be less reliable than the RF network. Accordingly, if the metric indicates the data stream is bandwidth intensive (e.g., by determining the metric is above a threshold bandwidth), associated with a streaming media application (e.g., video on demand, satellite TV, video conferencing), and/or associated with a quality of service (QoS) identifier above a threshold QoS level, the dual fidelity access point may communicate the data packets that form the data stream via the one or more transceivers. Conversely, if the metric indicates the data stream is not bandwidth intensive (e.g., by determining the metric is below a threshold bandwidth), not associated with a streaming media application (e.g., the particular application is a software and/or media loading application), and/or associated with a quality of service (QoS) identifier below a threshold QoS level, the network controller may communicate the data packets that form the data stream via the one or more LEDs.

Similarly, in some implementations, the LiFi network serves as an offloading network for when the RF network is overloaded. Accordingly, if the dual fidelity access point determines that a metric indicative of an aggregate amount of bandwidth required to transmit each of the identified data streams exceeds a threshold bandwidth, the dual fidelity access point may then communicate the data packets that form the particular individual data streams via the one or more LEDs. For example, the dual fidelity access point may select the particular individual data streams based on the data stream requiring bandwidth below the bandwidth threshold and/or not being associated with a streaming media application.

It should be appreciated that threshold bandwidth may vary depending upon the geographic location of the vehicle. For example, the vehicle may carry passengers between different regulatory jurisdictions. For example, the vehicle may carry passengers from the United States to Japan. In this example, the United States may permit the RF network to transmit over some frequencies that are not permitted in Japan. Accordingly the RF network may have fewer channels available to support the aggregate bandwidth requirement when the vehicle is located in the Japanese regulatory jurisdiction. Thus, the dual fidelity access point may be configured to lower the bandwidth threshold for LiFi offloading when the vehicle is located in the Japanese regulatory jurisdiction, In implementations where the LiFi network is used to mitigate nulls or "dead zones" associated with the RF network, the dual fidelity access point may identify data streams associated with a seatback device having a connection quality metric below a threshold connection quality. Accordingly, the dual fidelity access point may be configured to communicate the data packets that form the identified data streams via the one or more LEDs.

It should be appreciated that the network controller and/or connectivity applications (e.g., the connectivity application 146) at the seatback devices may be configured support hybrid fidelity communications. For example, the dual fidelity access point may communicate forward data packets for a data stream via the one or more LEDs and receive reverse data packets for the data stream via the one or more transceivers. Similarly, in embodiments configured with a LiFi reverse link, the dual fidelity access point may communicate forward data packets for a data stream via the one or more transceivers and receive reverse data packets for the data stream via one or more photo-detectors. In some embodiments, if the dual fidelity access point is communicating data packets via the one or more LEDS to two seatback devices located proximate to one another (e.g., located in the same seat unit or in an adjacent row), the dual fidelity access point may encode using two different, non-overlapping light spectra. In some embodiments, two different LEDs are utilized to emit the light at the non-overlapping spectra. In other embodiments, a single LED is configured to emit a composite light signal that includes both non-overlapping spectra.

It should be appreciated that the methods 300 and 350 may be expanded to include the network controller and/or the dual fidelity access point routing data packets to personal electronics devices (PEDs) over the LiFi network and/or the RF network. To this end, a PED may include built-in LiFi capabilities and/or include a port via which an attachable LiFi devices (e.g., a USB dongle) may be inserted. Accordingly, a passenger may interact with a respective PED to register the PED with the LiFi network and/or the RF network on-board the vehicle. When the PED establishes a data stream via the network controller and/or the dual fidelity access point, the network controller and/or the dual fidelity access point may route the data packets associated that form the data stream to the PED in accordance with the techniques described with respect to the methods 300 and 350.

Figure 5:
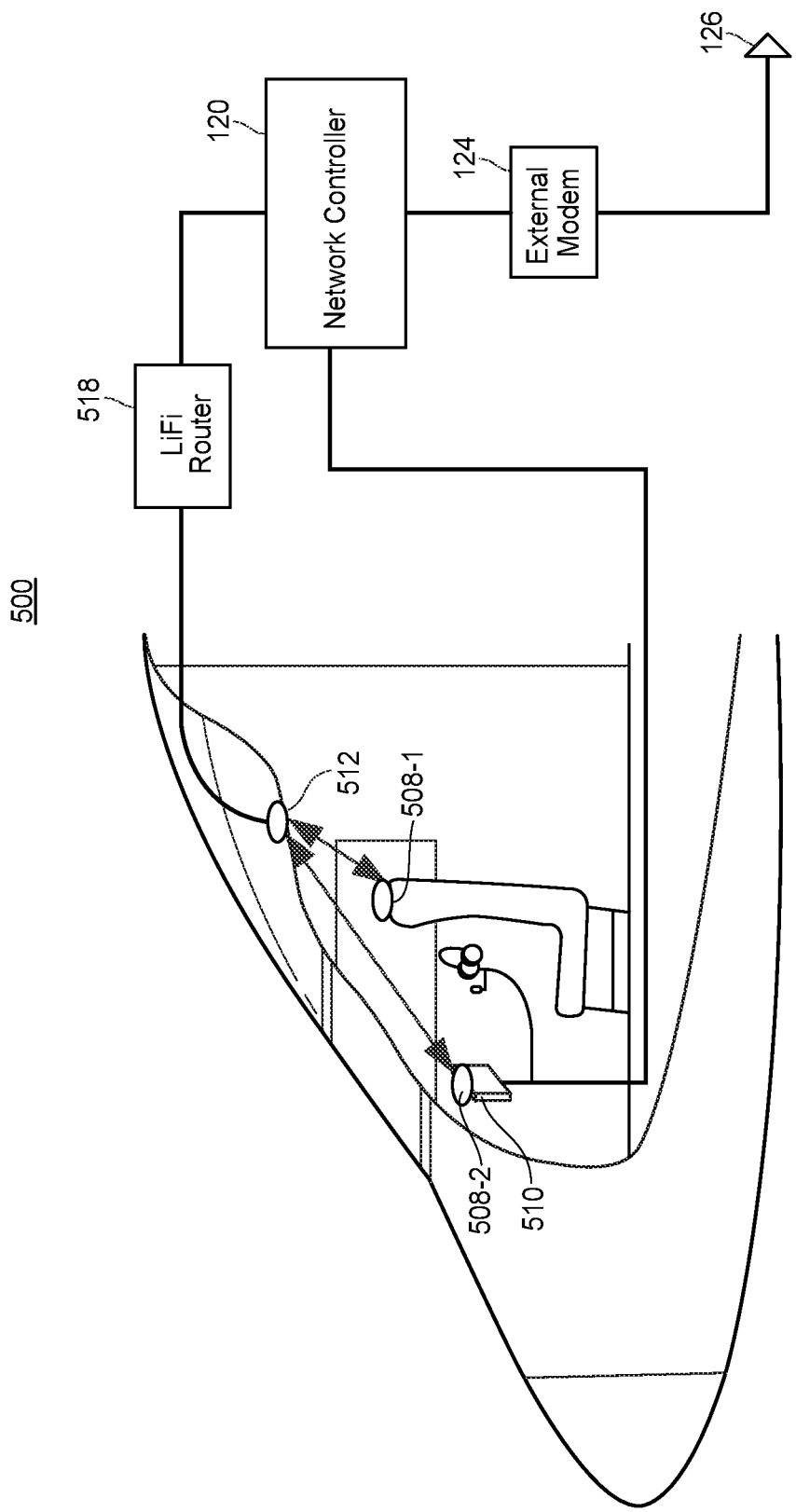
FIG. 5 depicts an example dual-fidelity communication system for providing communications to a vehicle flight deck.

Turning now to FIG. 5, illustrated is an example dual-fidelity communication system 500 for providing communications to a vehicle control deck. Generally, vehicle flight decks include RF sensitive equipment. Accordingly, RF communications may be prohibited within the vehicle flight deck to prevent interference with the RF sensitive equipment. However, LiFi communications do not generally cause RF interference. Thus, a LiFi communication system may be permitted to operate in vehicle flight decks where RF communication systems are prohibited. It should be appreciated that the dual-fidelity communication system 500 may be implemented in the same vehicle that implements one of the centralized dual fidelity communication system 100 of FIG. 1A and/or the distributed dual fidelity communication system 150 of FIG. 1B. Accordingly, the components described with respect to the dual-fidelity communication system 500 may additionally be configured to perform any action performed by the component as described with respect to FIGS. 1-4.

The dual-fidelity communication system 500 is configured to provide both wired communications and LiFi communications to the vehicle control equipment 510 located in the vehicle control deck. In the dual-fidelity communication system 500, the network controller 120 is configured to support vehicle control communications with an external control system. For example, the vehicle control communications may be based on the ACARS communication protocol and/or other communication protocols that support communication of vehicle operation data (such as LTE or satellite protocols). The network controller 120 is configured to obtain the vehicle operation data via one or more external modems 124 that is configured to transmit and/or receive data via the antenna 126.

To isolate the vehicle control equipment 510 from sources of RF interference, the vehicle control equipment 510 is connected to the network controller 120 via a wired communication interface (such as an Ethernet or a secure bus interface). In addition to the traditional wired connection to the network controller 120, the vehicle control equipment 510 is communicatively coupled to one or more photo-detectors 508. For example, the vehicle control equipment 510 may be communicatively coupled to a photo-detector 508-2 built or retrofitted into the vehicle control equipment 510 or attached via a communication port (e.g., via dongle inserted into a USB port), to the vehicle control equipment 510. Additionally or alternatively, the vehicle control equipment 510 may be communicatively coupled to a photo-detector 508-1 disposed in a seat located in the vehicle control deck (e.g., in a manner similar to how the photo-detector 108-2 is disposed at the seat 102-2). Accordingly, the vehicle control equipment 510 is configured to receive vehicle control data via the traditional wired interface and/or via the photo-detector 508.

As illustrated, the network control 120 is communicatively coupled to the LiFi router 118 which is configured to provide LiFi communications to devices located on board the vehicle, including in the vehicle control deck. When the network controller 120 routes vehicle control data to the LiFi router 118, the LiFi router 118 may be configured to encode the vehicle control data using a particular spectrum of light. The LiFi router 118 may then route the encoded light to one or more LEDs 512 located in the vehicle control deck for transmission to the vehicle control equipment 510 via the photo-detector 508. In some embodiments, a reverse link for vehicle control data is provided via one or more LEDs communicatively coupled to the vehicle control equipment 510 and a photo-detector located in the vehicle control deck that is communicatively coupled to the LiFi router 118.

Figure 6:
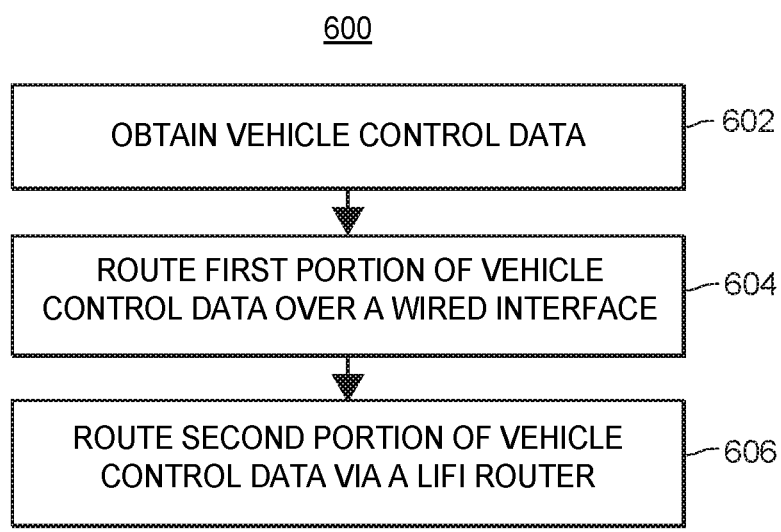
FIG. 6 is a flow diagram of an example method for providing dual fidelity communications on-board a vehicle equipped with a dual fidelity communication system of FIG. 5.

FIG. 6 depicts an example method 600 for providing dual fidelity communications on-board a vehicle (e.g., an aircraft, bus, train, subway, military transport vehicle, space craft, etc.). More particularly, the method 600 relates to routing vehicle control data to vehicle control equipment (e.g., the vehicle control equipment 510) over one of a traditional wired interface or a LiFi network via one or more LEDs (e.g., the LEDs 512). The method 600 may be implemented by a network controller, such as the network controller 120 of FIG. 1A, 1B, 2, or 5 for example. Various components of FIGS. 1A, 1B, 2, and 5 are referred to in the description of the method 600 for purposes of providing specific, non-limiting examples.

The method 600 begins when the network controller obtains, via one or more external modems, vehicle control data addressed to vehicle control equipment located in the vehicle control deck (block 602). In response the receiving the vehicle control data, the network controller may be configured to segment the vehicle control data into a first portion to be routed over the traditional wired interface and a second portion to be routed via a LiFi router (e.g., the LiFi router 118). For example, the network controller may determine that the bandwidth required to transmit the vehicle control data to the vehicle control equipment exceeds a threshold bandwidth. Accordingly, the network controller may identify a set of data packets that, if offloaded to a secondary network, would reduce the bandwidth required to transmit the remaining data packets below the threshold bandwidth. In this example, the network controller may be configured to include the remaining data packets in the first portion of the vehicle control data and the offloaded set of data packets in the second portion of the vehicle control data.

As another example, the network controller may segment the vehicle control data based on the particular item of vehicle control equipment the vehicle control data is associated with and/or the particular type of data indicated by the vehicle control data. For example, voice communications to and from a vehicle operator may be routed over the traditional wired interface and positioning and/or heading data may be routed via the LiFi router. In this example, the data packets that form the voice communications are included in the first portion of the vehicle control data and the data packets that indicate the positioning and/or heading data are included in the second portion of the vehicle control data. In this example, by offloading the non-voice data to the LiFi network, a higher quality voice connection between a vehicle operator and an external vehicle control center may be established.

After the network controller has segmented the vehicle control data, the network controller is configured to route the first portion of the vehicle control data over the traditional wired connection (block 604) and the second portion of the vehicle control data to the LiFi router (block 606). In embodiments that include a reverse LiFi link in the vehicle control deck, the network controller may also be configured to obtain internally-generated vehicle control data via the traditional wired interface and the LiFi router. In these embodiments, the network controller may be configured to aggregate the internally-generated vehicle control data into a single data stream between the network controller and an external vehicle control center. Accordingly, in these embodiments, the network controller may route the internally-generated vehicle control data to one or more external modems (e.g., the external modem 124) for transmission to the external vehicle control center.

Figure 7:
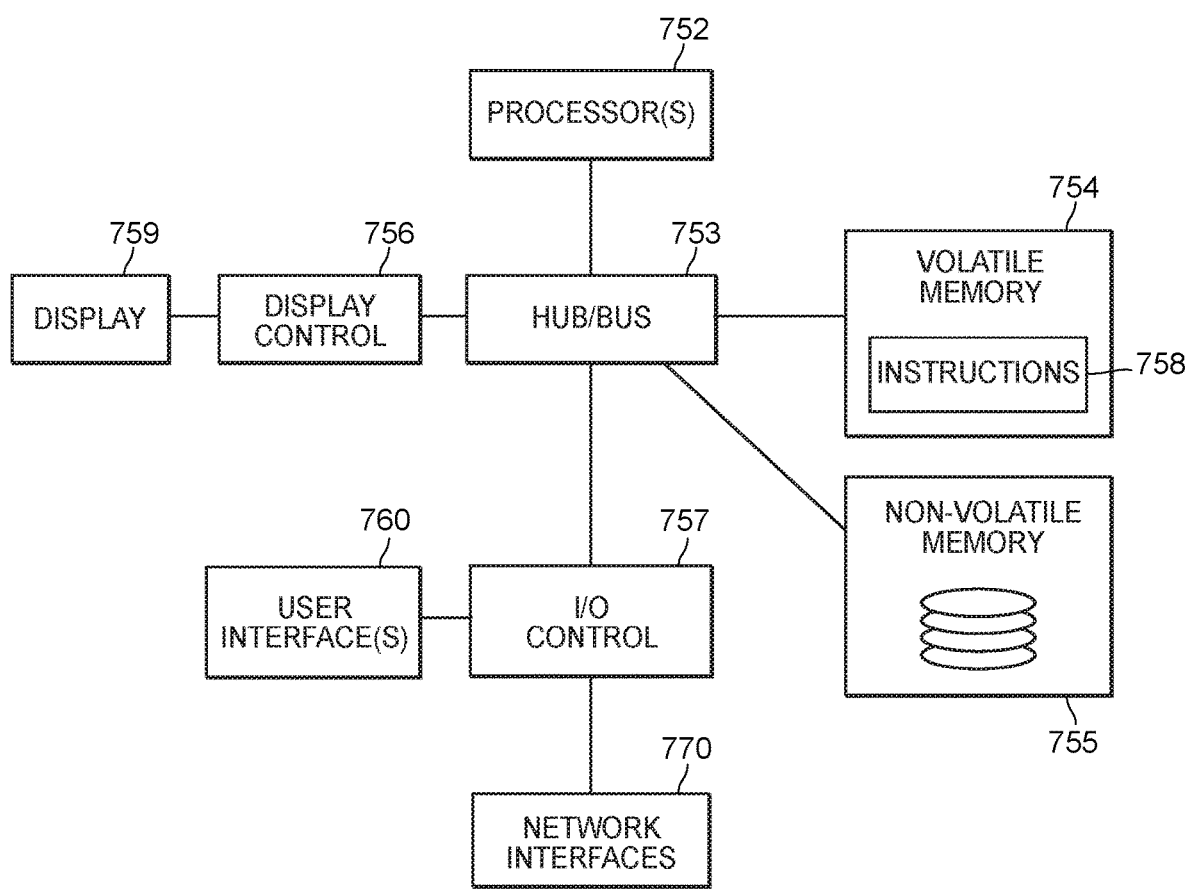
FIG. 7 is a block diagram of a network controller configured to provide dual fidelity communications to seatback devices on-board a vehicle.

FIG. 7 is a block diagram of an example network controller 120 that may be utilized in a system for providing dual fidelity communications to seatback devices within a passenger vehicle. The network controller 120 may include, for example, one more processors 752, and one or more buses or hubs 753 that connect the processor(s) 752 to other elements of the network controller 120, such as a volatile memory 754, a non-volatile memory 755, a display controller 756, and an I/O controller 757. The volatile memory 754 and the non-volatile memory 755 may each include one or more non-transitory, tangible computer readable storage media such as random access memory (RAM), read only memory (ROM), FLASH memory, a biological memory, a hard disk drive, solid state memory, a digital versatile disk (DVD) disk drive, etc.

In an embodiment, the volatile memory 754 and/or the non-volatile memory 755 may store instructions 758 that are executable by the processor(s) 752. For example, the instructions 758 may instruct the network controller 120 to perform the methods 300 or 600, as described above. Each of the modules, applications and engines described herein can correspond to a different set of machine readable instructions for performing one or more functions described above. These modules need not be implemented as separate software programs, procedures or modules, and thus various subsets of these modules can be combined or otherwise re-arranged in various embodiments. In some embodiments, at least one of the memories 754, 755 stores a subset of the modules and data structures identified herein. In other embodiments, at least one of the memories 754, 755 stores additional modules and data structures not described herein.

In an embodiment, display controller 756 may communicate with processor (s) 752 to cause information to be presented on a connected display device 759. In an embodiment, the I/O controller 757 may communicate with the processor(s) 752 to transfer information and commands to/from a user interface 760, which may include a mouse, a keyboard or key pad, a touch pad, click wheel, lights, a speaker, a microphone, etc. In an embodiment, at least portions of the display device 759 and of the user interface 760 are combined in a single, integral device, e.g., a touch screen. Additionally, data or information may be transferred to and from the network controller 120 via network interface 770s. In some embodiments, the network controller 120 may include an RF interface (e.g., an interface via which the network controller 120 is communicatively coupled to an RF router, such as the RF router 116), a LiFi interface (e.g., an interface via which the network controller 120 is communicatively coupled to a LiFi router, such as the LiFi router 118), an external communications interface (e.g., an interface via which the network controller 120 is communicatively coupled to one or more external modems, such as the external modems 124), and a wired interface (e.g., an interface via which the network controller 120 is communicatively coupled to vehicle control equipment, such as the vehicle control equipment 510).

The illustrated network controller 120 is only one example of a computing device suitable to be particularly configured for use in one of systems 100, 150, 200, and 500. Other embodiments of the network controller 120 may also, or instead, be used in one of systems 100, 150, 200, and 500, even if the other embodiments have more, fewer and/or different components than those shown in FIG. 7, have one or more combined components, or have a different configuration or arrangement of the components. Moreover, the various components shown in FIG. 7 can be implemented in hardware, a processor executing software instructions, or a combination of both hardware and a processor executing software instructions, including one or more signal processing and/or application-specific integrated circuits.

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A system for providing dual fidelity communications on-board a vehicle that includes a plurality of seats having corresponding seatback devices installed thereat, the system comprising: a radio frequency (RF) router operatively connected to one or more wireless access points distributed throughout the vehicle; a light fidelity (LiFi) router operatively connected to a plurality of lights disposed within respective overhead light systems, wherein each of the lights are configured to emit light directed towards a photo-detector associated with a seat corresponding to the respective overhead light system; and a network controller operatively connected to the RF router and the LiFi router, wherein the network controller is configured to: identify data streams associated with devices on-board the vehicle, wherein one or more of the data streams are associated with seatback devices on-board the vehicle; analyze the identified data streams to determine a metric associated with the one or more data streams; and based on the metric associated with a particular data stream associated with a particular seatback device, route data packets that form the particular data stream to one of the RF router or the LiFi router for transmission the particular seatback device.

2. The system of aspect 1, wherein: the metric is indicative of an amount of bandwidth required to transmit the data packets that form the particular data stream; and to route the data packets that form the particular data stream, the network controller is configured to: determine that the bandwidth required to transmit the data packets that form the particular data stream is below a threshold bandwidth; and route the data packets that form the particular data stream to the LiFi router for transmission to the particular seatback device.

3. The system of aspects 1 or 2, wherein: the metric is indicative of an amount of bandwidth required to transmit the data packets that form the identified data streams; and to route the data packets that form the particular data stream, the network controller is configured to: determine that the bandwidth required to transmit the data packets that form the identified data streams is above a threshold bandwidth; and route the data packets that form the one or more data streams to the LiFi router for transmission to respective seatback devices.

4. The system of any of aspects 1-3, wherein: the metric is indicative of an application associated with the particular data stream; and to route the data packets that form the particular data stream, the network controller is configured to: determine that the application associated with the particular data stream is a streaming media application; and route the data packets that form the particular data stream to the RF router for transmission to the particular seatback device.

5. The system of any of aspects 1-4, wherein: the metric is indicative of connection quality between the particular seatback device and a wireless access point to which the particular seatback device is connected, wherein the metric is based on at least one of signal strength, signal to noise ratio, carrier to noise ratio, receive power, or transmit power; and to route the data packets that form the particular data stream, the network controller is configured to: determine that the metric is below a threshold connection quality; and route the data packets that form the particular data stream to the RF router for transmission to the particular seatback device.

6. The system of any of aspects 1-5, wherein the lights are reading lights for providing illumination light to passengers associated with the seatback devices.

7. The system of any of aspects 1-6, wherein the network controller is configured to: determine whether a reading light corresponding to the particular seatback device is active; when the reading light is active, cause light within a visible light spectrum to be utilized for LiFi communications with the particular seatback device; and when the reading light is inactive, cause light within one of an infrared spectrum or an ultraviolet spectrum to be utilized for LiFi communications with the particular seatback device.

8. The system of any of aspects 1-7, wherein the network controller is configured to: determine that a first data stream of the one or more data streams includes data packets addressed to a first seatback device; determine that a second data stream of the one or more data streams includes data packets addressed to a second seatback device located proximate to the first seatback device; and causing light within a first spectrum to be utilized to communicate data to the photo-detector associated with the first seatback device and light within a second spectrum to be utilized to communicate data to the photo-detector associated with the second seatback device.

9. The system of any of aspects 1-8, wherein: the particular seatback device is operatively connected to a master seatback device; and to route the data packets that form the particular data stream, the network controller is configured to: route the data packets that form the particular data stream the LiFi router for transmission to the master seatback device to cause the master seatback device to transfer the data packets that form the particular data stream to the particular seatback device.

10. The system of any of aspects 1-9, wherein a particular photo-detector located at a particular seat is disposed on top of a head portion of the particular seat.

11. The system of any of aspects 1-10, wherein: the overhead light systems include a photo-detector for detecting light emitted by a light operatively connected to seatback device; and the network controller is configured to route forward traffic of the particular data stream to the particular seatback device via the RF router and receive reverse traffic of the particular data stream from the particular seatback device via the LiFi router.

12. The system of any of aspects 1-11, wherein the network controller is configured to route forward traffic of the particular data stream to the particular seatback device via the LiFi router and receive reverse traffic of the particular data stream from the particular seatback device via the RF router.

13. A dual fidelity access point disposed within a vehicle that includes a plurality of seats having corresponding seatback devices installed thereat, the dual fidelity access points including: one or more transceivers configured to communicate with the plurality of devices via a radio frequency (RF) communication protocol, one or more light emitting diodes (LEDs) configured to emit light in accordance with a light fidelity (LiFi) communication protocol, wherein the emitted light is detected by photo-detectors operatively connected to respective seatback devices; a bus interface communicatively coupled to a network controller; and a controller configured to: obtain, via the bus interface, data packets addressed to devices within a footprint of the dual fidelity access point; identify data streams associated with the data packets, wherein one or more of the data streams are associated with seatback devices on-board the vehicle; analyze the data streams to determine a metric associated with the one or more data streams; and based on the metric for a particular data stream associated with a particular seatback device, communicate the data packets that form the particular data stream to the particular seatback device via one of the one or more transceivers or the one or more LEDs.

14. The dual fidelity access point of aspect 13, wherein: the metric is indicative of an amount of bandwidth required to transmit the data packets that form the particular data stream; and to communicate the data packets that form the particular data stream, the controller is configured to: determine that the bandwidth required to transmit the data packets that form the particular data stream is below a threshold bandwidth; and communicate the data packets that form the particular data stream to the particular seatback device via the one or more LEDs.

15. The dual fidelity access point of aspect 13 or 14, wherein: the metric is indicative of an amount of bandwidth required to transmit the data packets that form the identified data streams; and to communicate the data packets that form the particular data stream, the controller is configured to: determine that the bandwidth required to transmit the data packets that form the identified data streams is above a threshold bandwidth; and communicate the data packets that form the particular data stream to the particular seatback device via the one or more LEDs.

16. The dual fidelity access point of any of aspects 13-15, wherein: the metric is indicative of an application associated with the particular data stream; and to communicate the data packets that form the particular data stream, the controller is configured to: determine that the application associated with the particular data stream is a streaming media application; and communicate the data packets that form the particular data stream to the particular seatback device via the one or more transceivers.

17. The dual fidelity access point any of aspects 13-16, wherein: the metric is indicative of connection quality between the particular seatback device and the dual mode access point via the one or more transceivers, wherein the metric is based on at least one of signal strength, signal to noise ratio, carrier to noise ratio, receive power, or transmit power; and to communicate the data packets that form the particular data stream, the controller is configured to: determine that the metric is below a threshold connection quality; and communicate the data packets that form the particular data stream to the particular seatback device via the one or more LEDs.

18. The dual fidelity access point of any of aspects 13-17, wherein the controller is configured to: determine that a first data stream of the one or more data streams includes data packets addressed to a first seatback device; determine that a second data stream of the one or more data streams includes data packets addressed to a second seatback device located proximate to the first seatback device; emit light from a first LED of the one or more LEDs using a first spectrum to communicate data to the first seatback device; and emit light from a second LED of the one or more LEDs using a second spectrum to communicate data to the second seatback device.

19. The dual fidelity access point of any of aspects 13-18, further comprising: a photo-detector for detecting light emitted by an LED associated with the particular seatback device.

20. The dual fidelity access point of any of aspects 13-19, wherein the controller is configured to: communicate forward traffic of the particular data stream to the particular seatback device via the one or more transceivers and receive reverse traffic of the particular data stream from the particular seatback device via the photo-detector.

21. The dual fidelity access point of any of aspects 13-20, wherein the controller is configured to communicate forward traffic of the particular data stream to the particular seatback device via the one or more LEDs and receive reverse traffic of the particular data stream from the particular seatback device via the one or more transceivers 22. A system for providing dual fidelity communications on-board a vehicle, the system comprising: a wired communications interface operatively connected to vehicle control equipment located in a vehicle control deck; a light fidelity (LiFi) router operatively connected to one or more of lights disposed within the vehicle control deck, wherein the one or more lights are configured to emit light directed towards a photo-detector operatively connected to the vehicle control equipment; one or more transceivers configured to exchange data with an external base station; and a network controller operatively connected to the wired communications interface and the LiFi router, wherein the network controller is configured to: obtain, via the one or more transceivers, vehicle control data; routing a first portion of the vehicle control data to the vehicle control equipment via the wired communications interface; and routing a second portion of the vehicle control data to the vehicle control equipment via the LiFi router.

23. The system of aspect 22, wherein the photo-detector is disposed within a dongle connected to a port of the vehicle control equipment.

24. The system of aspect 22 or 23, wherein the photo-detector is disposed within a seatback of a seat for a vehicle operator.

What is claimed is:

1. A system for providing dual fidelity communications on-board a vehicle that includes a plurality of seats having corresponding seatback devices installed thereat, the system comprising:
   a radio frequency (RF) router operatively connected to one or more wireless access points distributed throughout the vehicle;
   a light fidelity (LiFi) router operatively connected to a plurality of lights disposed within respective overhead light systems, wherein each of the lights are configured to emit light directed towards a photo-detector associated with a seat corresponding to the respective overhead light system; and
   a network controller operatively connected to the RF router and the LiFi router, wherein the network controller is configured to:
      identify data streams associated with devices on-board the vehicle, wherein one or more of the data streams are associated with seatback devices on-board the vehicle;
      analyze the identified data streams to determine a metric associated with the one or more data streams; and
      based on the metric associated with a particular data stream associated with a particular seatback device, route data packets that form the particular data stream to one of the RF router or the LiFi router for transmission the particular seatback device.

2. The system of claim 1, wherein:
   the metric is indicative of an amount of bandwidth required to transmit the data packets that form the particular data stream; and
   to route the data packets that form the particular data stream, the network controller is configured to:
      determine that the bandwidth required to transmit the data packets that form the particular data stream is below a threshold bandwidth; and
      route the data packets that form the particular data stream to the LiFi router for transmission to the particular seatback device.

3. The system of claim 1, wherein:
   the metric is indicative of an amount of bandwidth required to transmit the data packets that form the identified data streams; and
   to route the data packets that form the particular data stream, the network controller is configured to:
      determine that the bandwidth required to transmit the data packets that form the identified data streams is above a threshold bandwidth; and
      route the data packets that form the one or more data streams to the LiFi router for transmission to respective seatback devices.

4. The system of claim 1, wherein:
   the metric is indicative of an application associated with the particular data stream; and
   to route the data packets that form the particular data stream, the network controller is configured to:
      determine that the application associated with the particular data stream is a streaming media application; and
      route the data packets that form the particular data stream to the RF router for transmission to the particular seatback device.

5. The system of claim 1, wherein:
   the metric is indicative of connection quality between the particular seatback device and a wireless access point to which the particular seatback device is connected, wherein the metric is based on at least one of signal strength, signal to noise ratio, carrier to noise ratio, receive power, or transmit power; and
   to route the data packets that form the particular data stream, the network controller is configured to:
      determine that the metric is below a threshold connection quality; and
      route the data packets that form the particular data stream to the RF router for transmission to the particular seatback device.

6. The system of claim 1, wherein the lights are reading lights for providing illumination light to passengers associated with the seatback devices.

7. The system of claim 6, wherein the network controller is configured to:
   determine whether a reading light corresponding to the particular seatback device is active;
   when the reading light is active, cause light within a visible light spectrum to be utilized for LiFi communications with the particular seatback device; and
   when the reading light is inactive, cause light within one of an infrared spectrum or an ultraviolet spectrum to be utilized for LiFi communications with the particular seatback device.

8. The system of claim 1, wherein the network controller is configured to:
   determine that a first data stream of the one or more data streams includes data packets addressed to a first seatback device;
   determine that a second data stream of the one or more data streams includes data packets addressed to a second seatback device located proximate to the first seatback device; and
   causing light within a first spectrum to be utilized to communicate data to the photo-detector associated with the first seatback device and light within a second spectrum to be utilized to communicate data to the photo-detector associated with the second seatback device.

9. The system of claim 1, wherein:
   the particular seatback device is operatively connected to a master seatback device; and
   to route the data packets that form the particular data stream, the network controller is configured to:
      route the data packets that form the particular data stream to the LiFi router for transmission to the master seatback device to cause the master seatback device to transfer the data packets that form the particular data stream to the particular seatback device.

10. The system of claim 1, wherein a particular photo-detector located at a particular seat is disposed on top of a head portion of the particular seat.

11. The system of claim 1, wherein:
    the overhead light systems include a photo-detector for detecting light emitted by a light operatively connected to seatback device; and
    the network controller is configured to route forward traffic of the particular data stream to the particular seatback device via the RF router and receive reverse traffic of the particular data stream from the particular seatback device via the LiFi router.

12. The system of claim 1, wherein the network controller is configured to:
    route forward traffic of the particular data stream to the particular seatback device via the LiFi router and receive reverse traffic of the particular data stream from the particular seatback device via the RF router.

13. A dual fidelity access point disposed within a vehicle that includes a plurality of seats having corresponding seatback devices installed thereat, the dual fidelity access point including:
one or more transceivers configured to communicate with the plurality of devices via a radio frequency (RF) communication protocol, one or more light emitting diodes (LEDs) configured to emit light in accordance with a light fidelity (LiFi) communication protocol, wherein the emitted light is detected by photo-detectors operatively connected to respective seatback devices;
a bus interface communicatively coupled to a network controller; and
a controller configured to:
obtain, via the bus interface, data packets addressed to devices within a footprint of the dual fidelity access point;
identify data streams associated with the data packets, wherein one or more of the data streams are associated with seatback devices on-board the vehicle;
analyze the data streams to determine a metric associated with the one or more data streams; and
based on the metric for a particular data stream associated with a particular seatback device, communicate the data packets that form the particular data stream to the particular seatback device via one of the one or more transceivers or the one or more LEDs.

14. The dual fidelity access point of claim 13, wherein:
the metric is indicative of an amount of bandwidth required to transmit the data packets that form the particular data stream; and
to communicate the data packets that form the particular data stream, the controller is configured to:
determine that the bandwidth required to transmit the data packets that form the particular data stream is below a threshold bandwidth; and
communicate the data packets that form the particular data stream to the particular seatback device via the one or more LEDs.

15. The dual fidelity access point of claim 13, wherein:
the metric is indicative of an amount of bandwidth required to transmit the data packets that form the identified data streams; and
to communicate the data packets that form the particular data stream, the controller is configured to:
determine that the bandwidth required to transmit the data packets that form the identified data streams is above a threshold bandwidth; and
communicate the data packets that form the particular data stream to the particular seatback device via the one or more LEDs.

16. The dual fidelity access point of claim 13, wherein:
the metric is indicative of an application associated with the particular data stream; and to communicate the data packets that form the particular data stream, the controller is configured to:
determine that the application associated with the particular data stream is a streaming media application; and
communicate the data packets that form the particular data stream to the particular seatback device via the one or more transceivers.

17. The dual fidelity access point of claim 13, wherein:
the metric is indicative of connection quality between the particular seatback device and the dual mode access point via the one or more transceivers, wherein the metric is based on at least one of signal strength, signal to noise ratio, carrier to noise ratio, receive power, or transmit power; and
to communicate the data packets that form the particular data stream, the controller is configured to:
determine that the metric is below a threshold connection quality; and
communicate the data packets that form the particular data stream to the particular seatback device via the one or more LEDs.

18. The dual fidelity access point of claim 13, wherein the controller is configured to:
determine that a first data stream of the one or more data streams includes data packets addressed to a first seatback device;
determine that a second data stream of the one or more data streams includes data packets addressed to a second seatback device located proximate to the first seatback device;
emit light from a first LED of the one or more LEDs using a first spectrum to communicate data to the first seatback device; and
emit light from a second LED of the one or more LEDs using a second spectrum to communicate data to the second seatback device.

19. The dual fidelity access point of claim 18, wherein the controller is configured to:
communicate forward traffic of the particular data stream to the particular seatback device via the one or more transceivers and receive reverse traffic of the particular data stream from the particular seatback device via the photo-detector.

20. The dual fidelity access point of claim 13, further comprising:
a photo-detector for detecting light emitted by an LED associated with the particular seatback device.

21. The dual fidelity access point of claim 13, wherein the controller is configured to:
communicate forward traffic of the particular data stream to the particular seatback device via the one or more LEDs and receive reverse traffic of the particular data stream from the particular seatback device via the one or more transceivers.

* * * * *